United States Patent
Vaittinen et al.

(10) Patent No.: US 8,081,999 B2
(45) Date of Patent: Dec. 20, 2011

(54) ENHANCED ASSISTED CELL CHANGE

(75) Inventors: Rami Vaittinen, Littoinen (FI); Harri Jokinen, Pertteli (FI); Guillaume Sebire, Helsinki (FI)

(73) Assignee: Nokia Corporation, Espoo (FI)

( * ) Notice: Subject to any disclaimer, the term of this patent is extended or adjusted under 35 U.S.C. 154(b) by 282 days.

(21) Appl. No.: 11/205,224

(22) Filed: Aug. 16, 2005

(65) Prior Publication Data
US 2006/0079242 A1    Apr. 13, 2006

Related U.S. Application Data

(60) Provisional application No. 60/609,787, filed on Sep. 14, 2004.

(51) Int. Cl.
*H04B 7/00* (2006.01)

(52) U.S. Cl. ........ 455/525; 455/434; 455/436; 455/450; 455/453; 455/503; 455/513; 455/515; 370/252; 370/312; 370/328; 370/432

(58) Field of Classification Search .................. 455/507, 455/513, 515, 518, 519, 509, 503, 450, 452.1, 455/452.2, 517, 520, 525, 436–444, 434, 455/453; 370/310, 329, 331, 335, 342, 432, 370/312, 436, 252, 254, 255, 328, 431
See application file for complete search history.

(56) References Cited

U.S. PATENT DOCUMENTS

| | | | |
|---|---|---|---|
| 5,915,221 A * | 6/1999 | Sawyer et al. | 455/437 |
| 6,032,047 A * | 2/2000 | Cerwall et al. | 455/450 |
| 6,058,302 A * | 5/2000 | Westerberg | 455/411 |
| 6,167,282 A * | 12/2000 | Hunsberger | 455/513 |
| 6,188,904 B1 | 2/2001 | Marsan | |
| 6,434,389 B1 * | 8/2002 | Meskanen et al. | 455/437 |

(Continued)

FOREIGN PATENT DOCUMENTS

EP    0720402 A2    7/1996
(Continued)

OTHER PUBLICATIONS

"3rd Generation Partnership Project; Technical Specification Group Services and System Aspects; Multimedia Broadcast/Multicast Service; Stage 1" (Release 6), 3GPP TS 22.146 V6.5.0 (Jun. 2004).

(Continued)

*Primary Examiner* — Olumide T Ajibade Akonai
(74) *Attorney, Agent, or Firm* — Harrington & Smith

(57) ABSTRACT

A system and method for minimizing signalling loads due to mutual exchanges of information between neighboring cells in which the same session is transmitted, and for reducing the time required to transmit MBMS neighbor cell information messages in a serving cell when a higher level of signalling occurs, wherein all broadcast control channel (BCCH) carriers indicated in a BCCH allocation are monitored by a mobile station (MS). A list of the cells having the strongest non-serving carriers is updated as often as the duration of the running average for measurements of the BCCH allocation. Base transceiver station identity codes (BSICs) and neighboring cell indexes of BCCH carriers are added to an uplink radio link control/medium access control (RLC/MAC) message that is transmitted to a network. As a result, the network is provided with the identity of which cell the mobile station is most likely to reselect to upon reception of the uplink RLC/MAC control message carrying the BSICs and neighboring cell indexes of the neighboring non-serving BCCH carriers of the mobile station.

46 Claims, 3 Drawing Sheets

U.S. PATENT DOCUMENTS

| | | | |
|---|---|---|---|
| 6,771,960 B1* | 8/2004 | Otting et al. | 455/434 |
| 6,788,952 B1* | 9/2004 | Jokimies et al. | 455/525 |
| 6,882,842 B2* | 4/2005 | Stephan et al. | 455/434 |
| 7,110,776 B2* | 9/2006 | Sambin | 455/456.1 |
| 7,142,860 B2* | 11/2006 | Mildh et al. | 455/443 |
| 7,209,743 B2* | 4/2007 | Babovic | 455/436 |
| 7,257,421 B2* | 8/2007 | Vasudevan et al. | 455/525 |
| 7,437,178 B2* | 10/2008 | Jeong et al. | 455/525 |
| 2001/0011019 A1* | 8/2001 | Jokimies | 455/449 |
| 2003/0194992 A1 | 10/2003 | Kim et al. | 455/414.1 |
| 2003/0224790 A1* | 12/2003 | Choi | 455/435.3 |
| 2004/0008657 A1 | 1/2004 | Lee et al. | 370/342 |
| 2004/0097233 A1* | 5/2004 | Pecen et al. | 455/437 |
| 2004/0103435 A1* | 5/2004 | Yi et al. | 725/81 |
| 2004/0147266 A1* | 7/2004 | Hwang et al. | 455/445 |
| 2004/0152480 A1 | 8/2004 | Willars et al. | |
| 2004/0180681 A1 | 9/2004 | Jeong et al. | 455/503 |
| 2004/0202140 A1* | 10/2004 | Kim et al. | 370/335 |
| 2004/0248575 A1 | 12/2004 | Rajala et al. | 455/436 |
| 2005/0041608 A1* | 2/2005 | Jeong et al. | 370/310 |
| 2005/0042987 A1* | 2/2005 | Lee et al. | 455/67.11 |
| 2005/0079870 A1 | 4/2005 | Rick et al. | 455/437 |
| 2005/0232292 A1* | 10/2005 | Richards et al. | 370/432 |
| 2005/0282571 A1* | 12/2005 | Oprescu-Surcobe et al. | 455/503 |

FOREIGN PATENT DOCUMENTS

| | | |
|---|---|---|
| EP | 1 076 465 | 2/2001 |
| EP | 1 347 614 | 9/2003 |
| JP | 2000-013843 A | 1/2000 |
| WO | WO 00/79808 | 12/2000 |

OTHER PUBLICATIONS

"Assisted Cell Change during MBMS p-t-m transmission", 3GPP TSG GERAN #21 Montreal, Canada, Aug. 23-27, 2004.

3rd Generation Partnership Project; Technical Specification Group GSM/EDGE; Radio Access Network; Radio subsystem link control (Release 6), 3GPP TS 45.008 V6.9.0 (Aug. 2004).

"Universal Mobile Telecommunications System (UMTS); Multimedia Broadcast/Multimedia Broadcast/Multicast Service (MBMS); Stage 1 (3GPP TS 22.146 version 5.2.0 Release 5) ETSI TS 122 146" Standards, European Telecommunications Standards Institute, Sophia-Antipo, FR, vol. 3-SA1, No. V520, Mar. 2002, XP014007342 ISSN:0000-0001 Paragraphs 4 and 5.

3GPP: 3rd Generation Partnership Project; Technical Specification Group Radio Access Network; Introduction of the Multimedia Broadcast Multicast Service (MBMS) in the Radio Access Network (Stage-2); (Release 6); 3GPP TS 25.346 V1.1.0; 3GPP TS 25.346 V1.1.0, May 2002, pp. 1-11, XP002260225.

3GPP TS 44.060 V7.2.0 (Nov. 2005); 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7).

3GPP TS 44.018 V7.2.0 (Nov. 2005); 3rd Generation Partnership Project; Technical Specification Group GSM/EDGE Radio Access Network; Mobile radio interface layer 3 specification; Radio Resource Control (RRC) protocol; (Release 7).

3GPP TSG GERAN#21; Tdoc GP-042013; Montreal, Canada, Aug. 23-27, 2004; Agenda Items: 6.6, 7.1.5.7, 7.2.5.4.2; Source: Siemens, Telecom Italia S.p.A., Vodafone; "Assisted Cell Change during MBMS p-t-m transmission", pp. 1-9.

3GPP TS 45.008 V6.9.0 (Aug. 2004); 3rd Generation Partnership Project; Technical Specification Group GSM/EDGE; Radio Access Network; Radio subsystem link control; (Release 6).

3GPP TS 22.146 V6.5.0 (Jun. 2004); 3rd Generation Partnership Project; Technical Specification Group Services and System Aspects; Multimedia Broadcast/Multicast Service; Stage 1; (Release 6).

3GPP TS 43.246 vo.15.0 (Aug. 2004); 3$^{rd}$ Generation Partnership Project; Technical Specification Group GSM/EDGE Radio Access Network; Multimedia Broadcast Service (MBMS) in the Geran Stage 2 (Rlease 6).

* cited by examiner

ENHANCED ASSISTED CELL CHANGE

RELATED APPLICATIONS

This application claims priority from U.S. Provisional Application Ser. No. 60/609,787 filed Sep. 14, 2004.

BACKGROUND OF THE INVENTION

1. Field of the Invention

The invention is directed to a system and methods for transmitting/receiving data during Broadcast mode and Multicast mode and, more particularly, to a method for minimizing signalling loads due to mutual exchanges of information between neighboring cells in which a session is transmitted, and for reducing a time required to transmit MBMS neighbor cell information messages in a serving cell when a higher level of signalling occurs.

2. Detailed Description of the Related Art

MBMS (Multimedia Broadcast/Multicast Service) is a unidirectional Point-to-Multipoint (p-t-m) multicast/broadcast service in which data is transmitted from a single source entity to a group of users located in a specific area. MBMS may comprise a selection of unidirectional p-t-m bi-directional point-to-point (p-t-p) transmissions of multimedia data, such as text, audio, picture, or video, from a single source entity to a multiplicity of users in a service area. As stated in the 3rd Generation Partnership Project (3GPP) Technical Specification (TS) 22.146, "Multimedia Broadcast/Multicast Service; Stage 1", it is a goal of MBMS is to allow the provision of multiple instances of a p-t-p service with a single transmission over a radio interface as a radio multicast. "Service area" for a given MBMS service is hereafter to be understood as the geographical area (i.e. set of cells) where the service is made available.

MBMS has two modes, e.g., Broadcast mode and Multicast mode. The main difference between these two modes is that in Broadcast mode all MBMS users in the service area are targeted for receipt of transmitted data, whereas in Multicast mode it is possible to address only a subset of the MBMS users in the service area for receipt of the data. As defined in the 3GPP TS 22.146, "Multimedia Broadcast/Multicast Service; Stage 1," Multicast mode typically requires a user to subscribe to a multicast group before receiving the service.

In GP-042013 "Assisted Cell Change during MBMS p-t-m Transmission", Siemens, Telecom Italia S.p.A, Vodafone, 3GPP TSG GERAN#21 (Montreal, Canada), a solution is described for providing a source cell with the information about the MBMS bearer (p-t-m channel) in the neighboring cells for a given session. With reference to FIG. 1, it is optimal if a mobile station (MS) can resume reception of MBMS data in the target cell as soon as a new cell has been selected, during acquisition of Packet-Broadcast Control Channel (P-BCCH) information, or during a Routing Area Update procedure.

MBMS traffic channel configuration and MBMS service ID information is sent via an existing Radio Link Control/Medium Access Control (RLC/MAC) message, such as a conventional packet neighbor cell data (PNCD) message that is used to convey neighboring cell system information in a serving cell. Alternatively, the MBMS traffic channel configuration and MBMS service ID information is sent in a new message that is transmitted on a packet associated control channel (PACCH) that is associated with the MBMS traffic p-t-m channel. A new message is defined herein as MBMS neighbor cell information, whether it is a PNCD message or a new message.

MBMS neighbor cell information (Cell C, Session S) refers to an MBMS neighbor cell information message that contains at least: i) the parameters that permit identification of and access to the neighboring cell C; (ii) the parameters of the MBMS bearer (p-t-m channel) on which the session S is transmitted in cell C; and/or (iii) an identifier of the session S. This information is transmitted for the following reasons: (i) as a way to provide the users with available information as soon as possible, subsequent to commencement of the MBMS data transfer in the serving cell; (ii) when the MBMS bearer (p-t-m channel) is reconfigured or an initiation of the new MBMS service in a specific neighboring cell has occurred. In this case, the base station controller (BSC) broadcasts the new bearer configuration on the packet associated control channel (PACCH) in the specific neighboring cell; (iii) when periodic repetitions of the information is required in order for mobile stations (MS) (e.g., mobile phones, PDA, etc.) entering the cell (e.g. late arrivals) to acquire the information; and (iv) when a repetition of the information is further required to account for possible errors on an air interface.

The main problem associated with the conventional method for receiving data during Broadcast mode and Multicast mode is the high level of signal loading that is triggered by the mutual exchange of information between neighboring cells in which the same session is being transmitted. This signalling load not only comprises the applicable signalling load between BSCs, but more importantly it comprises the signalling load on the air interface of each cell. This leads to an overall reduction in system performance and data throughput. For example, if a session S is ongoing in a given cell A, and if the same session S is ongoing in a cell B neighboring cell A, then the parameters of the p-t-m information for session S in cell B must be sent in cell A, and the parameters of the p-t-m information for session S in cell A must also be sent in cell B. In other words, MBMS neighbor cell information (Cell A, Session S) must be sent in Cell B, and MBMS neighbor cell information (Cell B, Session S) must be sent in Cell A. This principle applies to every single ongoing session in any given cell, for all 4 cases where information is transmitted, as listed above.

Another problem associated with receiving data during Broadcast mode and Multicast mode, which is also implied by the problem described above, is that the higher the amount of signalling (i.e. the higher the amount of neighboring cells and the amount of ongoing sessions both in the serving cell and one or more of its neighboring cells), the longer the time it takes to send all the necessary MBMS neighbor cell information messages in the serving cell. As a result, a mobile station (MS), i.e. an MS that is in motion, has a lower probability of receiving the p-t-m information for the cell into which it is moving prior to reselecting the new cell. Thus, the utility associated with transmitting neighboring cell information in broadcast mode or multicast mode becomes jeopardized.

Accordingly, there is a need to minimize the signalling load due to mutual exchanges of information between neighboring cells in which the same session is being transmitted, and to reduce the time required to send MBMS neighbor cell information messages in a serving cell when a higher level of signalling occurs.

SUMMARY OF THE INVENTION

The invention is directed to a system and method for minimizing signal loading due to mutual exchanges of information between neighboring cells in which the same session is being transmitted. The invention is also directed to reducing the time required to transmit Multimedia Broadcast/Multicast Service (MBMS) neighbor cell information messages in a serving cell when a higher level of signalling occurs. In accordance with the invention, a mobile station (MS) is provided with a way to inform a network about the cell(s) to which the MS is most likely to make cell reselection. When appropriate, the network is provided with the ability to prioritize the MBMS neighbor cell information messages for at least one cell, and potentially avoid transmitting MBMS neighbor cell information messages for cells that have not been indicated by any MS as a cell to which the MS will reselect. In the preferred embodiment of the invention, the network prioritizes the MBMS neighbor cell information messages when the same session is active in at least one neighbor cell.

In accordance with the invention, base station identity codes (BSICs) and cell indexes of a fixed number of the neighboring broadcast control channel (BCCH) carriers having the highest signaling levels are appended to an uplink radio link control/medium access control (RLC/MAC) message that is sent from the mobile station to the network. As a result, the need for the network to always send the MBMS neighboring cell information of all neighboring cells in the network is eliminated. In this case, only some, or all of the cells with BCCH carriers having the highest signaling levels are provided with the MBMS neighboring cell information messages. In the preferred embodiment, the fixed number of cells with BCCH carriers having the highest signaling levels, reported by the mobile station, is six.

Upon reception of the uplink RLC/MAC control message carrying the BSICs and neighboring cell indexes of the neighboring non-serving BCCH carriers of the mobile station, the network knows the cells to which the mobile station is most likely to reselect. Based on this information, the network can prioritize the MBMS NEIGHBOR CELL INFORMATION messages broadcast in the serving cell for these neighboring cells when applicable (i.e., when the same session is ongoing in one or more of these cells). Moreover, the network may potentially avoid sending MBMS neighbor cell information messages for neighboring cells to which the mobile station will not reselect, even when one of the above described information transmission criteria is met. As a result, faster repetitions of broadcasted MBMS neighbor cell information is provided. In addition, mobile stations that arrive "late" to the cell are provided with the necessary information more quickly. Furthermore, the network is permitted to reschedule the order in which neighbor cell information is transmitted, e.g., where one particular neighbor cell appears as a reselection candidate for one mobile station and when information for other requested neighbors was previously sent.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are merely intended to conceptually illustrate the structures and procedures described herein.

BRIEF DESCRIPTION OF THE DRAWINGS

The foregoing and other advantages and features of the invention will become more apparent from the detailed description of the preferred embodiment of the invention given below with reference to the accompanying drawings in which.

DETAILED DESCRIPTION OF THE EXEMPLARY EMBODIMENTS

The present invention is a system and method for minimizing signal loading due to mutual exchanges of information between neighboring cells in which the same session is transmitted. The invention is also directed to reducing the transmittal time required to send MBMS neighbor cell information messages in a serving cell when a higher level of signalling occurs.

Figure 1:
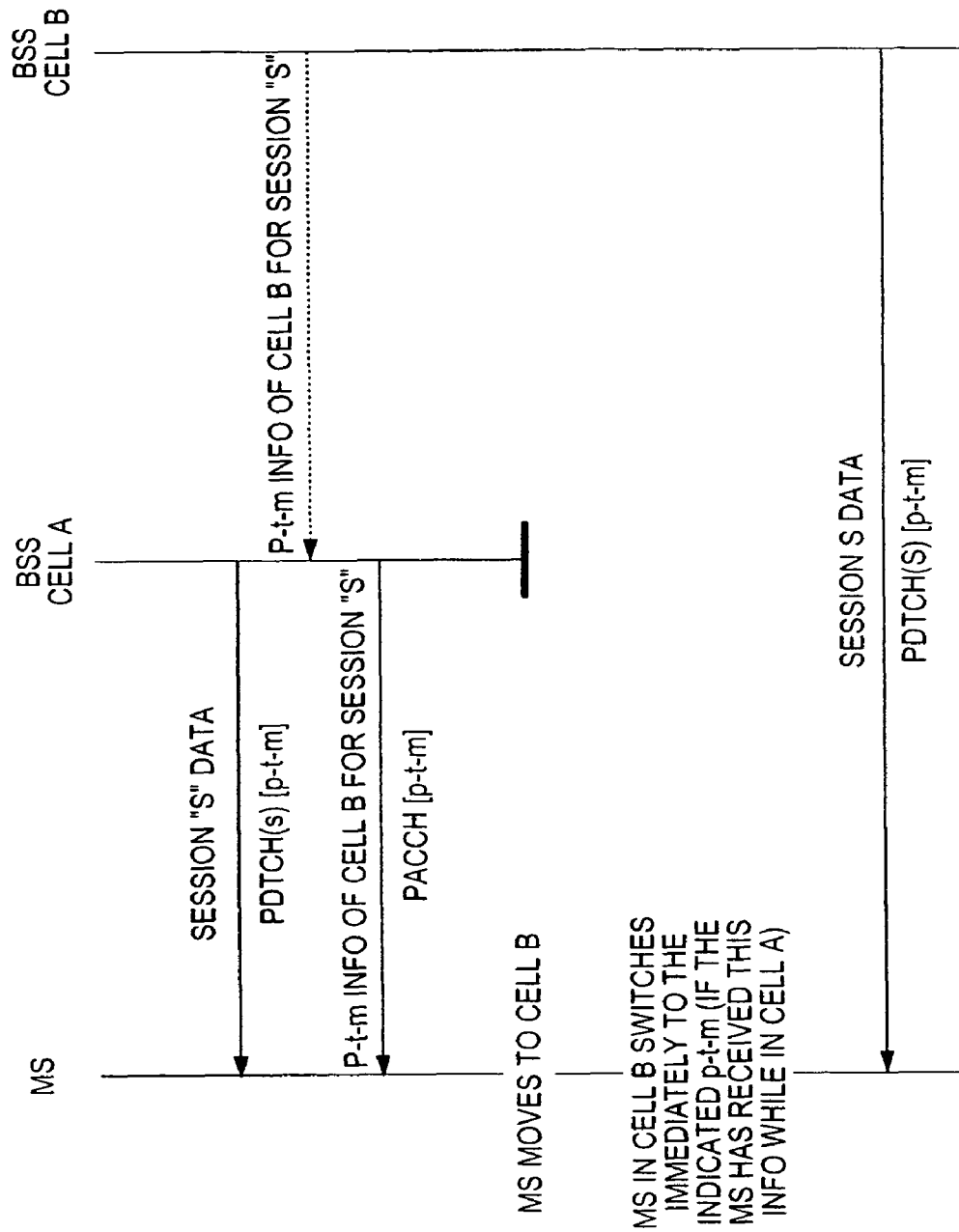
FIG. 1 is an exemplary flow diagram illustrating the reception of multimedia broadcast/multicast (MBMS) data between neighboring cells for a given session.
Figure 2:
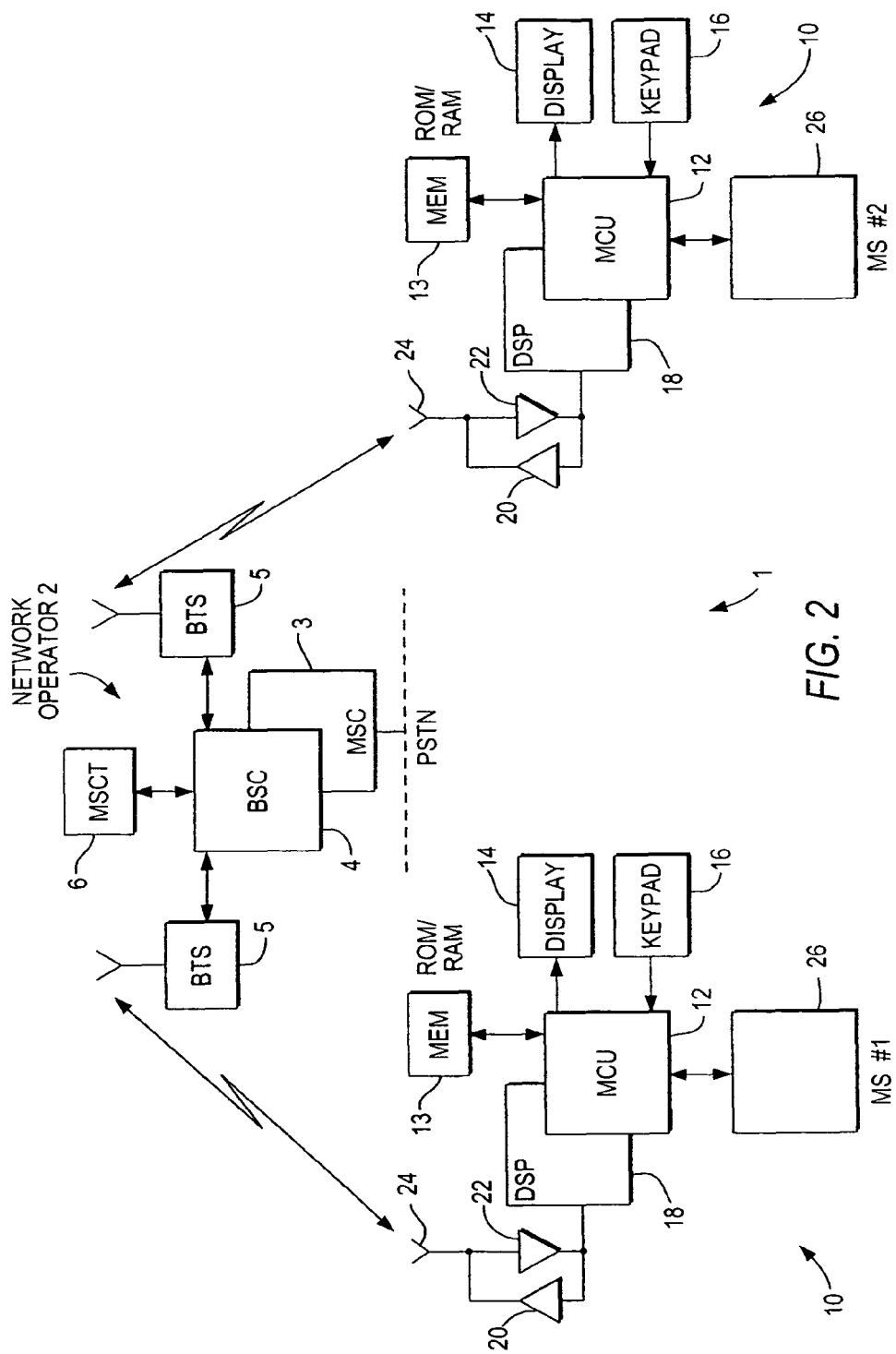
FIG. 2 is an exemplary block diagram of a wireless communication system in which the method of the invention is implemented.

Referring to FIG. 2, shown therein is a simplified block diagram of an embodiment of an exemplary wireless telecommunications system I that includes a plurality of mobile terminals or stations 10. Two mobile stations (MSs) 10 are shown, with one being designated MS#1 and the other MS#2. FIG. 2 also shows an exemplary network operator 2 having, for example, a mobile switching center (MSC) 3 for connecting to a telecommunications network, such as the Public Switched Telephone Network (PSTN), at least one base station controller (BSC) 4, and a plurality of base transceiver stations (BTS) 5 that transmit in a forward or downlink direction both physical and logical channels to the mobile stations 10 in accordance with a predetermined air interface standard. It is assumed that a reverse or uplink communication path exists from the mobile station 10 to the network operator, which conveys mobile originated access requests and traffic, as well as signaling for implementing the invention. The BTSs 5 define cells, which can be different sizes, different frequencies and so forth.

The air interface standard may conform to a Time Division Multiple Access (TDMA) air interface, and the network may be an Universal Mobile Telecommunications System (UMTS) network or other type of network. However, the teachings of the present invention apply equally to Code Division Multiple Access (CDMA) networks, as well as to other network types.

The network operator 2 can include a Message Service Center (MSCT) 6 that receives and forwards messages for the MS 10, such as Short Message Service (SMS) messages, or any wireless messaging technique including e-mail and Supplementary Data Services. Furthermore, enhancements to SMS can be used, such as one under development and known as Multimedia Messaging Service (MMS), wherein image messages, video messages, audio messages, text messages, executables and the like, and combinations thereof, can be transferred between a network and a mobile station.

The mobile station (MS) 10 typically includes a microcontrol unit (MCU) 12 having an output coupled to an input of a display 14 and an input coupled to an output of a keyboard or keypad 16. The MS 10 may be considered to be a handheld radiotelephone, such as a cellular, mobile telephone or a personal communicator, and may have a microphone and a speaker (not shown) for conducting voice communications. The MS 10 could also be contained within a card or module that is connected during use to another device. For example, the MS 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received data packets and data packets prepared for transmission, etc. The memory 13 is assumed to store the various parameters which are used by the MS 10 for performing cell reselection.

A separate, removable SIM (not shown) can be also be provided, the SIM storing, for example, a preferred Public Land Mobile Network (PLMN) list and other subscriber-related information. The ROM is assumed, for the purposes of this invention, to store a program enabling the MCU 12 to execute the software routines required to operate in accordance with the presently preferred embodiment of the present invention.

The MS 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator 2. The receiver 22 is used for making signal measurements used in the cell reselection process.

In accordance with the invention, all broadcast control channel (BCCH) carriers indicated in a BCCH allocation are monitored by a mobile station (MS) 10, while the MS is in a packet idle mode and during which the identity of an MBMS bearer (p-t-m) is received. A list of the cells with non-serving BCCH carriers having the highest signaling levels is updated at least as often as a predefined duration of the running average that is defined for measurements of the BCCH carrier allocation. Here, an assumption is made that the MS is operating in a new mode. In addition, as defined in the 3GPP TS 45.008 V6.9.0 (2004-08) TS "Radio Access Network; Radio subsystem link control (Release 6), the MS attempts to decode a BCCH data block containing parameters that affect cell reselection for each of the non-serving cell BCCH carriers having the highest signal levels. In the preferred embodiment, the maximum number of cells with non-serving BCCH carriers at the highest signaling levels that the MS indicates to the network is 6.

The MS 10 indicates the base transceiver station identity codes (BSICs) and neighboring cell indexes of BCCH carriers by adding them to an uplink radio link control/medium access control (RLC/MAC) message, e.g., a packet downlink acknowledge/nonacknowledge (ACK/NACK) or with a new message, which is transmitted to the network. As a result, the network is provided with the identity of which cell the MS 10 is most likely to reselect to upon reception of the uplink RLC/MAC message carrying the BSICs and neighboring cell indexes of the neighboring non-serving BCCH carriers of the MS. In addition, the network is permitted to prioritize the MBMS neighbor cell information messages that are broadcast in the serving cell for these neighboring cells when applicable (i.e., when the same session is ongoing in one or more of these cells). Moreover, the network is permitted to avoid potentially sending MBMS neighbor cell information messages for neighboring cells to which the mobile station will not reselect, even when one of the conventional transmission criteria is met.

Figure 3:
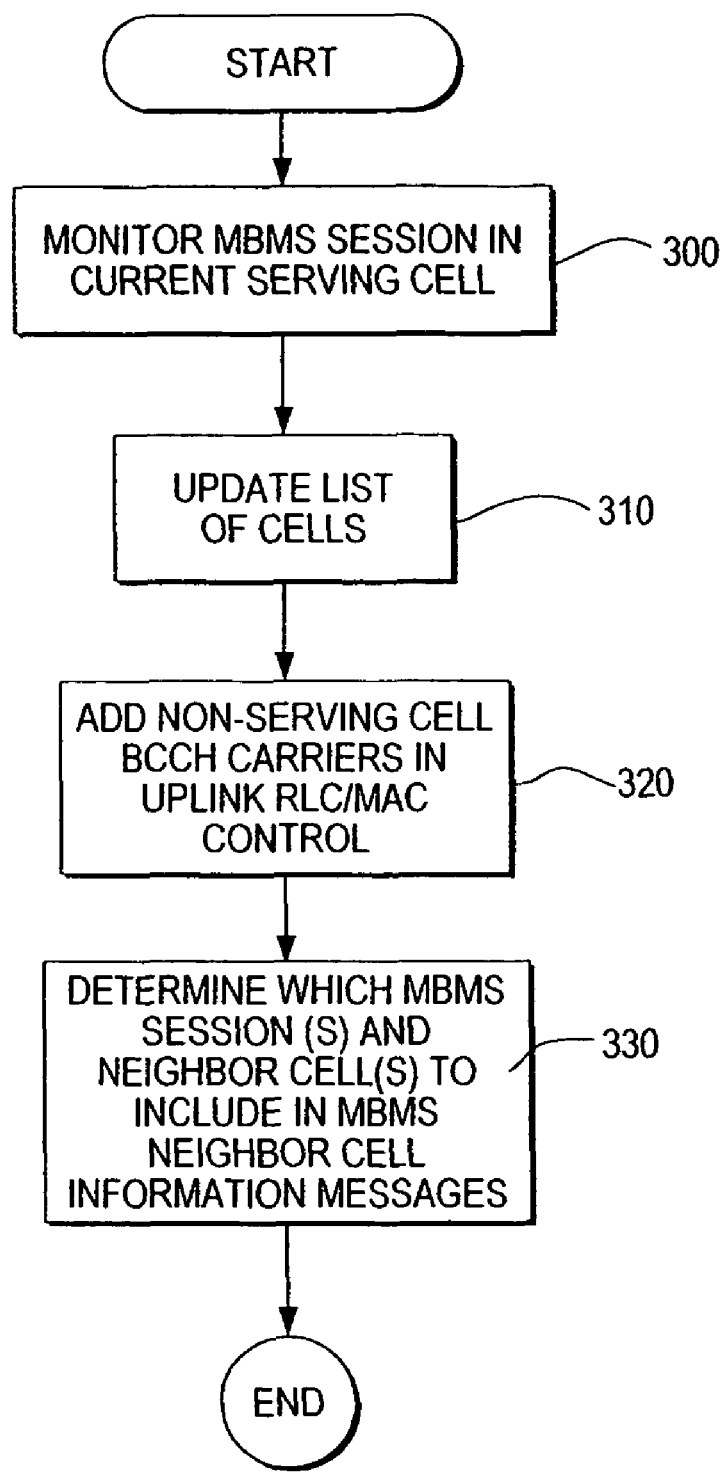
FIG. 3 is a flow chart illustrating the steps of the method in accordance with an embodiment of the present invention.

FIG. 3 is a flow chart illustrating the steps of the method in accordance with the present invention. The method of the invention is implemented by monitoring an MBMS session in a cell in which the MBMS session is active, as indicated in step 300. Here, all broadcast control channel (BCCH) carriers indicated in a BCCH allocation are monitored by a mobile station (MS), while the MS is in a packet idle mode and during which the identity of a MBMS bearer (p-t-m) is received.

A list of the cells having the strongest non-serving carriers is updated, as indicated in step 310. In this case, the list of cells is updated for a predetermined time period that is at least as often as the duration of the running average for measurements of the BCCH carrier allocation.

Next, non-serving cell BCCH carriers are added in an uplink radio link control/medium access control (RLC/MAC) message sent by an MS to the network, as indicated in step 320. Here, the MS indicates the base transceiver station identity codes (BSICs) and neighboring cell indexes of BCCH carriers by adding them in an RLC/MAC message, e.g., a packet downlink acknowledge/nonacknowledge (ACK/NACK) or with a new message, which is transmitted to the network. In the preferred embodiment, up to six non-serving cell BCCH carriers are added to the RLC/MAC message.

Next, a decision is performed by the network to determine which MBMS session(s) and neighbor cell(s) to include in the MBMS neighbor cell information messages that are broadcast by the serving cell, as indicated in step 330. This decision can be made on the basis of the previously described mobile station reports, as well as the network's knowledge of the ongoing MBMS session(s) on the likely reselection candidate cell(s) for one or more of the mobile stations being served. As a result, the network is able to prioritize the MBMS neighbor cell information to be broadcast by the serving cell, i.e., the MBMS neighbor cell information for a particular neighbor cell and MBMS session need not be broadcast, even if this particular session is broadcast at one of the neighboring cells but this cell is an unlikely reselection candidate for any of the mobile stations receiving this particular MBMS session in the serving cell.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
   receiving, from a wireless terminal, a message indicating a plurality of neighbor cells having highest signaling levels;
   prioritizing multimedia broadcast/multicast service neighbor cell information based on at least the indicated plurality of neighbor cells; and
   transmitting the prioritized multimedia broadcast/multicast service neighbor cell information,
   wherein the message indicates a number of neighbor cells and the number does not exceed a maximum number.

2. The method of claim 1, wherein the message comprises base transceiver station identity codes and neighboring cell indexes of broadcast control channel carriers for the indicated plurality of neighbor cells.

3. The method of claim 1, further comprising: allocating broadcast control channel carriers for a corresponding multimedia broadcast/multicast service session of the wireless terminal.

4. The method of claim 1, wherein the message comprises a packet downlink acknowledge/nonacknowledge message.

5. The method of claim 1, wherein the message comprises a packet downlink acknowledge/nonacknowledge message configured to indicate an acknowledgement status for data blocks belonging to a monitored multimedia broadcast/multicast service session.

6. The method of claim 1, wherein the message comprises a radio link control/medium access control message.

7. The method of claim 1, wherein the maximum number is six.

8. The method of claim 1, wherein the message indicates up to six non-serving cell broadcast control channel carriers having highest signal levels.

9. The method of claim 1, wherein prioritizing the multimedia broadcast/multicast service neighbor cell information is further based on a network's knowledge of at least one ongoing multimedia broadcast/multicast service session.

10. The method of claim 1, wherein a multimedia broadcast/multicast service session is active in a current cell of the wireless terminal, wherein prioritizing the multimedia broadcast/multicast service neighbor cell information is further based on the multimedia broadcast/multicast service session being active in at least one neighbor cell.

11. The method of claim 1, wherein transmitting comprises transmitting on a packet associated control channel.

12. A non-transitory computer readable medium tangibly encoded with a computer program executable by a processor to perform operations, said operations comprising:
   receiving, from a wireless terminal, a message indicating a plurality of neighbor cells having highest signaling levels;
   prioritizing multimedia broadcast/multicast service neighbor cell information based on at least the indicated plurality of neighbor cells; and
   transmitting the prioritized multimedia broadcast/multicast service neighbor cell information,
   wherein the message indicates a number of neighbor cells, wherein the number does not exceed a maximum number.

13. The computer readable medium of claim 12, wherein the message comprises base transceiver station identity codes and neighboring cell indexes of broadcast control channel carriers for the indicated plurality of neighbor cells.

14. The computer readable medium of claim 12, said operations further comprising: allocating broadcast control channel carriers for a corresponding multimedia broadcast/multicast service session of the wireless terminal.

15. The computer readable medium of claim 12, wherein the message comprises a packet downlink acknowledge/nonacknowledge message.

16. The computer readable medium of claim 12, wherein the message comprises a packet downlink acknowledge/nonacknowledge message configured to indicate an acknowledgement status for data blocks belonging to a monitored multimedia broadcast/multicast service session.

17. The computer readable medium of claim 12, wherein the message comprises a radio link control/medium access control message.

18. The computer readable medium of claim 12, wherein the maximum number is six.

19. The computer readable medium of claim 12, wherein the message indicates up to six non-serving cell broadcast control channel carriers having highest signal levels.

20. The computer readable medium of claim 12, wherein prioritizing the multimedia broadcast/multicast service neighbor cell information is further based on a network's knowledge of at least one ongoing multimedia broadcast/multicast service session.

21. The computer readable medium of claim 12, wherein a multimedia broadcast/multicast service session is active in a current cell of the wireless terminal, wherein prioritizing the multimedia broadcast/multicast service neighbor cell information is further based on the multimedia broadcast/multicast service session being active in at least one neighbor cell.

22. An apparatus comprising at least one processor; and at least one memory including computer program code, the at least one memory and the computer program code configured to, with the at least one processor, cause the apparatus to perform at least the following:
   to monitor a multimedia broadcast/multicast service session in a cell in which the multimedia broadcast/multicast service session is active and to update a list of cells having strongest non-serving carriers;
   to indicate, based on the updated list, a plurality of neighbor cells having highest signaling levels in an uplink message to a network,
   wherein the uplink message indicates a number of neighbor cells, wherein the number does not exceed a maximum number,
   wherein the uplink message to the network comprises a packet downlink acknowledge/nonacknowledge message; and
   to receive prioritized multimedia broadcast/multicast service neighbor cell information from the network.

23. The apparatus of claim 22, wherein the message comprises base transceiver station identity codes and neighboring cell indexes of broadcast control channel carriers for the indicated plurality of neighbor cells.

24. The apparatus of claim 22, wherein the packet downlink acknowledge/nonacknowledge message is configured to indicate an acknowledgement status for data blocks belonging to the monitored multimedia broadcast/multicast service session.

25. The apparatus of claim 22, wherein the message indicates up to six non-serving cell broadcast control channel carriers having highest signal levels.

26. The apparatus of claim 22, wherein the apparatus comprises a mobile station.

27. An apparatus comprising:
   means for receiving, from a wireless terminal, a message indicating a plurality of neighbor cells having highest signaling levels;
   means for prioritizing multimedia broadcast/multicast service neighbor cell information based on at least the indicated plurality of neighbor cells; and
   means for transmitting the prioritized multimedia broadcast/multicast service neighbor cell information,
   wherein the message indicates a number of neighbor cells, wherein the number does not exceed a maximum number.

28. The apparatus of claim 27, wherein the message comprises a packet downlink acknowledge/nonacknowledge message configured to indicate an acknowledgement status for data blocks belonging to a monitored multimedia broadcast/multicast service session.

29. The apparatus of claim 27, wherein the means for receiving comprises a receiver, the means for prioritizing comprises a processor and the means for transmitting comprises a transmitter.

30. The apparatus of claim 27, wherein the transmitting means comprises means for transmitting on a packet associated control channel.

31. An apparatus comprising at least one processor; and at least one memory including computer program code, the at least one memory and the computer program code configured to, with the at least one processor, cause the apparatus to perform at least the following:
to receive, from a wireless terminal, a message indicating a plurality of neighbor cells having highest signaling levels;
to prioritize multimedia broadcast/multicast service neighbor cell information based on at least the indicated plurality of neighbor cells; and
to transmit the prioritized multimedia broadcast/multicast service neighbor cell information,
wherein the message indicates a number of neighbor cells, wherein the number does not exceed a maximum number.

32. The apparatus of claim 31, wherein the message comprises base transceiver station identity codes and neighboring cell indexes of broadcast control channel carriers for the indicated plurality of neighbor cells.

33. The apparatus of claim 31, wherein the at least one memory and the computer program code are further configured to cause the apparatus to allocate broadcast control channel carriers for a corresponding multimedia broadcast/multicast service session of the wireless terminal.

34. The apparatus of claim 31, wherein the message comprises a packet downlink acknowledge/nonacknowledge message.

35. The apparatus of claim 31, wherein the message comprises a packet downlink acknowledge/nonacknowledge message configured to indicate an acknowledgement status for data blocks belonging to a monitored multimedia broadcast/multicast service session.

36. The apparatus of claim 31, wherein the message comprises a radio link control/medium access control message.

37. The apparatus of claim 31, wherein the maximum number is six.

38. The apparatus of claim 31, wherein the message indicates up to six non-serving cell broadcast control channel carriers having highest signal levels.

39. The apparatus of claim 31, wherein the at least one memory and the computer program code are further configured to cause the apparatus to prioritize the multimedia broadcast/multicast service neighbor cell information further based on a corresponding network's knowledge of at least one ongoing multimedia broadcast/multicast service session.

40. The apparatus of claim 31, wherein a multimedia broadcast/multicast service session is active in a current cell of the wireless terminal, wherein prioritizing the multimedia broadcast/multicast service neighbor cell information is further based on the multimedia broadcast/multicast service session being active in at least one neighbor cell.

41. The apparatus of claim 31, wherein the apparatus comprises a base station.

42. The apparatus of claim 31, wherein the at least one memory and the computer program code are further configured to cause the apparatus to transmit on a packet associated control channel.

43. A method comprising:
monitoring a multimedia broadcast/multicast service session in a cell in which the multimedia broadcast/multicast service session is active;
updating a list of cells having strongest non-serving carriers;
indicating, based on the updated list, a plurality of neighbor cells having highest signaling levels in an uplink message to a network,
wherein the uplink message indicates a number of neighbor cells, wherein the number does not exceed a maximum number,
wherein the uplink message to the network comprises a packet downlink acknowledge/nonacknowledge message; and
receiving prioritized multimedia broadcast/multicast service neighbor cell information from the network.

44. The method of claim 43, wherein the message comprises base transceiver station identity codes and neighboring cell indexes of broadcast control channel carriers for the indicated plurality of neighbor cells.

45. The method of claim 43, wherein the packet downlink acknowledge/nonacknowledge message is configured to indicate an acknowledgement status for data blocks belonging to the monitored multimedia broadcast/multicast service session.

46. The method of claim 43, wherein the message indicates up to six non-serving cell broadcast control channel carriers having highest signal levels.

* * * * *